(12) United States Patent
Lorenc

(10) Patent No.: US 8,786,385 B1
(45) Date of Patent: Jul. 22, 2014

(54) ROTARY JOINT FOR RADIO FREQUENCY ELECTROMAGNETIC WAVES AND LIGHT WAVES

(76) Inventor: Curtis D Lorenc, Grant-Valkaria, FL (US)

( * ) Notice: Subject to any disclaimer, the term of this patent is extended or adjusted under 35 U.S.C. 154(b) by 318 days.

(21) Appl. No.: 12/590,633

(22) Filed: Nov. 12, 2009

(51) Int. Cl.
*H01P 1/06* (2006.01)
*G02B 6/36* (2006.01)

(52) U.S. Cl.
CPC .............. *H01P 1/062* (2013.01); *G02B 6/3604* (2013.01)
USPC ............... 333/256; 333/261; 333/26; 333/33; 385/25; 385/26

(58) Field of Classification Search
CPC ........... H01P 1/06; H01P 1/062; H01P 1/065; H01P 5/103; G02B 6/3604
USPC ........... 333/256, 257, 261, 26, 33; 385/25, 26
See application file for complete search history.

(56) References Cited

U.S. PATENT DOCUMENTS

| | | | | |
|---|---|---|---|---|
| 2,830,276 | A * | 4/1958 | Zaleski | 333/256 |
| 3,599,127 | A * | 8/1971 | Krijger | 333/256 |
| 4,529,986 | A * | 7/1985 | d'Auria et al. | 342/433 |
| 5,039,193 | A * | 8/1991 | Snow et al. | 385/25 |
| 5,140,289 | A | 8/1992 | Andrieu | |

OTHER PUBLICATIONS

Ciavollella, Take the Hassle Out of High Power Design, Microwaves, Jun. 1972, pp. 60-62, USA.

Woodward, A Dual-Channel Rotary Joint for High Average Power Operation, IEEE Transactions on Microwave Theory & Techniques, Dec. 1970, pp. 1072-1077, vol. MTT-18, No. 12, IEEE, USA.

King, Broad-Band Coaxial Choked Coupling Design, IEEE Transactions on Microwave Theory & Techniques, Mar. 1960, pp. 132-135, IEEE, USA.

Raabe, A Rotary Joint for Two Microwave Transmission Channels of the Same Frequency Band, IEEE Transactions on Microwave Theory & Techniques, Jul-55, pp. 30-41, IEEE, USA.

* cited by examiner

*Primary Examiner* — Benny Lee

(57) ABSTRACT

One embodiment of an axial rotary joint having rotary transmission lines for the bi-directional propagation of radio frequency electromagnetic waves and light waves across a rotary interface. Each section is capable of fully independent rotation about a common longitudinal axis. The radio frequency rotary transmission line comprises waveguide tubing at each end that transitions to a coax transmission line at the rotary interface. The waveguide tubing also functions as the axial support structure. The second transmission line for light wave propagation is fully integrated into the waveguide-to-coax transition and the inner coaxial conductor, and uses optical coupling devices to form an optical coupling path across the rotary interface. This embodiment of the rotary joint can be sealed and pressurized to minimize contamination of the optics and to increase the electromagnetic wave power handling. The second transmission line in another embodiment is a combined millimeter wave and optical transmission line supporting simultaneous millimeter wave and light wave propagation across the rotary interface. Combining and decombining filters incorporated into the physical rotary transmission lines in other embodiments create a multitude of channels on various frequencies and wavelengths, greatly increasing the usefulness of the device.

15 Claims, 10 Drawing Sheets

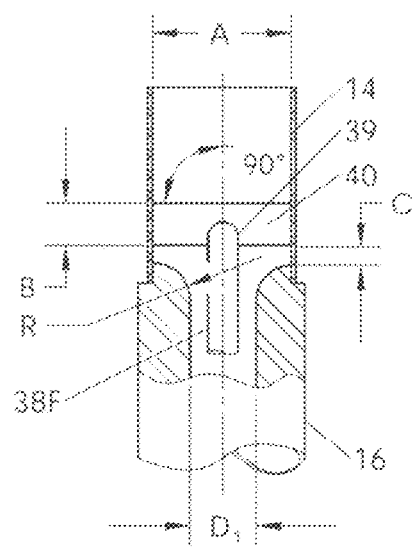 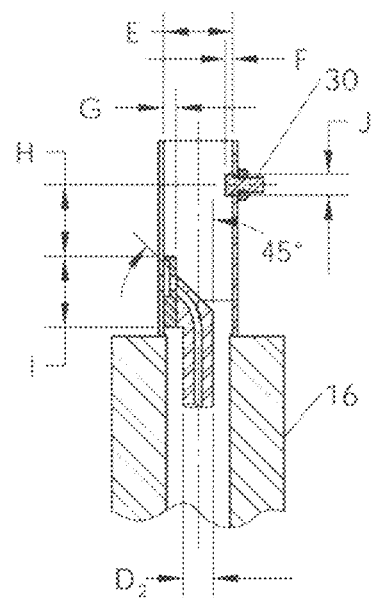
Fig. 5A Fig. 5B
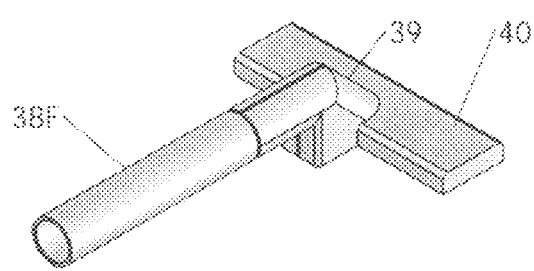 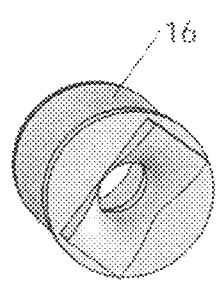
Fig. 6 Fig. 7

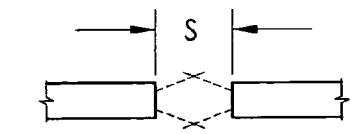
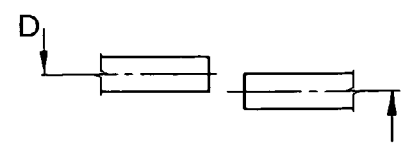
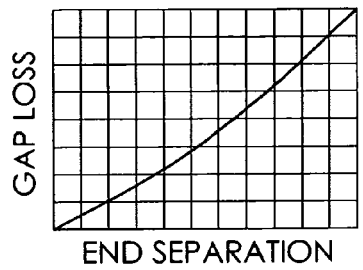
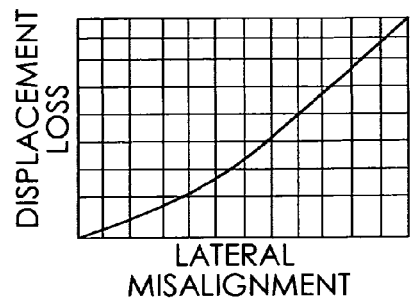
Fig. 8A        Fig. 8B
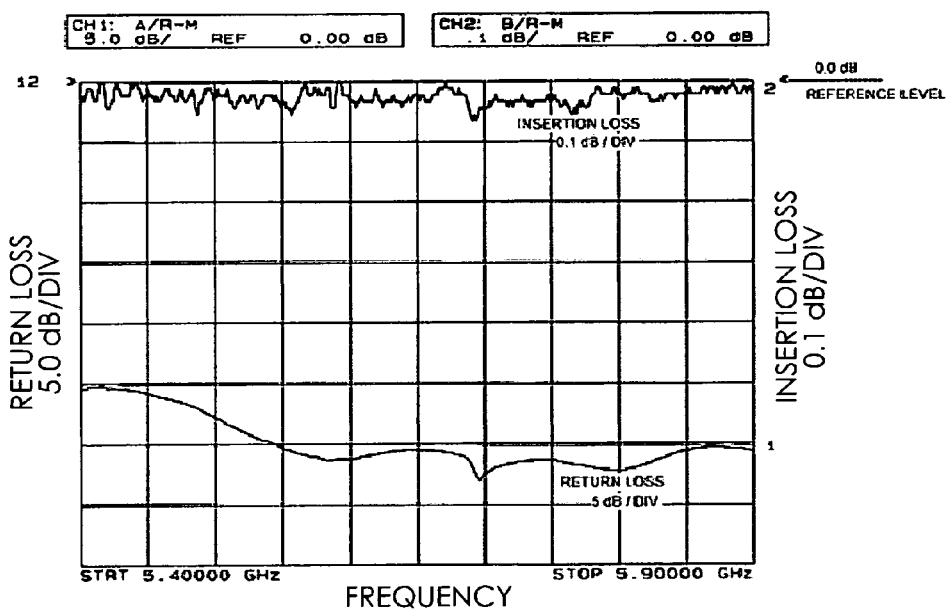
MEASURED INSERTION AND RETURN LOSS TX1
Fig. 9

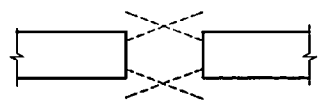
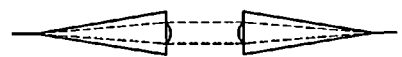
Fig.10A                    Fig.10B
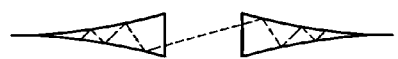
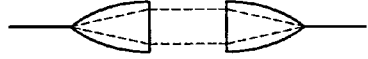
Fig.10C                    Fig.10D
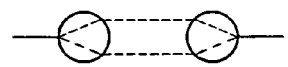
Fig.10E                    Fig.10F
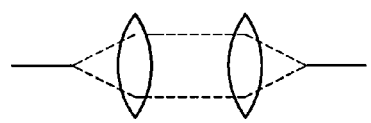
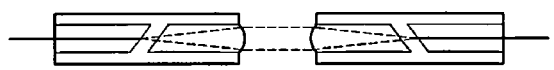
Fig.10G                    Fig.10H
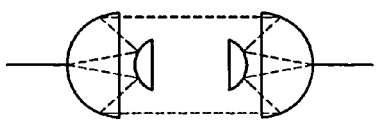
Fig.10I                    Fig.10J

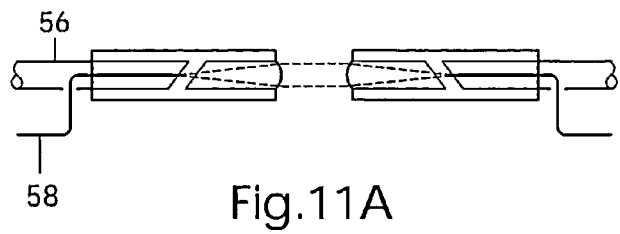
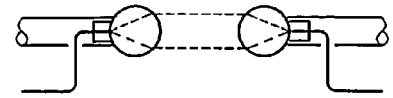
Fig.11A       Fig.11B
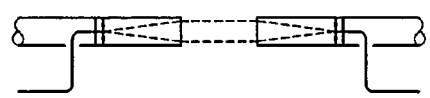
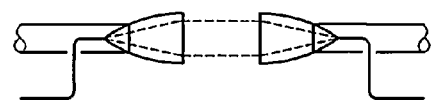
Fig.11C       Fig.11D
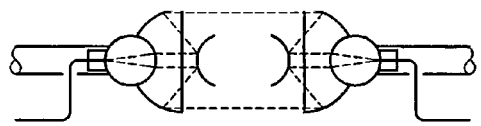
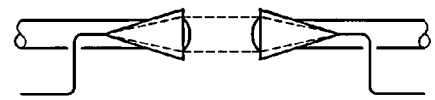
Fig.11E       Fig.11F

ROTARY JOINT FOR RADIO FREQUENCY ELECTROMAGNETIC WAVES AND LIGHT WAVES

CROSS-REFERENCE TO RELATED APPLICATIONS

None

FEDERALLY SPONSORED RESEARCH

Not Applicable

SEQUENCE LISTING OR PROGRAM

Not Applicable

BACKGROUND OF THE INVENTION

1. Field

This application generally relates to devices for the transfer of electromagnetic waves and light waves across a rotary interface, specifically to a bi-directional, multiple-transmission-line rotary joint with each section of the rotary joint capable of independent rotation.

2. Prior Art

Electronic systems that use rotatable antenna assemblies have continuously evolved to produce smaller, more compact systems with greater performance. Present trends seem to be heading toward mounting more of the system electronics on the back of the antenna to improve performance. This trend requires a greater number of high-frequency signals to be connected from the electronics on the rotatable antenna to the electronics in the system's base unit through a rotary joint.

In the prior art, combined microwave and optic rotary joints require large, heavy mounting plates or fixed members, and also bring the waveguide connections into the rotary joint from the side, perpendicular to the axis of rotation, making for large, heavy, complicated designs that are expensive to produce and not particularly suitable for modern, compact systems.

U.S. Pat. No. 5,140,289 (18 Aug. 1992) shows a combined microwave and optic rotary joint. The device requires the waveguide transmission lines to be mounted perpendicular to the axis of rotation, making for large, complex connections that take up a great deal of space and add weight, as illustrated in FIG. 13 (prior art). The waveguide transmission line in this device is limited to the microwave frequency range. This device also requires a fixed flange or mounting plate, called "a fixed part", which prevents independent rotation of both rotary joint sections. It lacks features necessary for pressurization. The device uses one fixed lens and one rotating lens to transmit optical energy between the rotating section and the fixed section so that only one side of the optical transmission line can rotate. The device does not employ optical anti-reflection techniques to reduce degradation of the light wave signal in the optical channel. The device has connections for more than one waveguide transmission line to be connected to the device to create additional microwave channels, which may further add to size, weight, cost, and complexity in manufacturing and assembly.

Advantages of the Present Application

Since modern rotary antenna systems are typically designed for maximum compactness and light weight, and each antenna system typically has two rotary joints (one in azimuth and one in elevation), it is desirable to use the most efficient, compact mechanical structure possible for the rotary joint. A method of making the mechanical structure more compact is by having the connecting waveguide transmission line act as the support structure to an in-line, or axial, rotary joint. A preferred embodiment of the device of the present application provides a compact, rotationally stable, relatively simple axial rotary joint that uses the connecting waveguide as an axial support as illustrated in FIG. 14. The main connecting waveguide transmission line is the only necessary external support structure for this simpler, lighter weight device, and eliminates the need for the fixed mounting plate or fixed member of the prior art illustrated in FIG. 13. The axial approach allows for fully independent rotation of either section of the rotary joint because no section of the rotary joint is constrained by a "fixed part".

A preferred embodiment of the present application employs a triple bearing arrangement to minimize optical signal degradation due to vibration modulation and alignment issues, offering greater mechanical stability and optical signal quality than the prior art.

The axial waveguide-to-coaxial line transition assembly used in a preferred embodiment of the present application has a path for a fully integrated second transmission line, and is capable of being pressurized and tuned for lowest reflected energy with a precision impedance matching device, maximizing power handling capability.

The various embodiments of the present application can use any of a wide variety of optical coupling devices that employ techniques to reduce reflections and minimize alignment issues, improving performance through the optical transmission line. The flexibility in being able to use different coupling devices affords a way of optimizing the rotary interface for a particular application or system requirement.

There are mechanical limitations on the number of physical channels that can be constructed in a rotary joint. A novel way of addressing this problem is with the incorporation of combining and decombining filters. The light wave transmission line in particular has tremendous bandwidth that can carry many optical signals. The incorporation of combining and decombining filters into any embodiment enable the light wave transmission line to carry a multitude of independent signals on different wavelengths. This filter technique also applies to the radio frequency electromagnetic wave transmission line to combine and decombine different radio frequency signals.

One of the advantages of a fiber optic light wave transmission line is its great immunity to interference. In one embodiment, the light wave transmission line can also function as a combined, dual-mode millimeter wave and light wave transmission line. The fiber optic transmission line can lie inside a millimeter waveguide transmission line, and both transmission lines are able to carry their respective signals across the rotary interface with minimal interference with each other. There appears to be no prior art at this time for a rotary interface that uses an optical coupling device to support simultaneous, bi-directional light wave and millimeter wave coupling on a combined millimeter wave and optical transmission line.

The various possible embodiments of the present application combine the advantages of high-power waveguide capability and high-performance light wave or combined light wave/millimeter wave capability in a bi-directional, multi-transmission-line rotary joint. With transmission lines for radio frequency electromagnetic wave, millimeter wave and light wavelengths, the various possible embodiments of the present application can cover much wider bandwidth than the combined microwave and optic rotary joint of the prior art. Use of a combined millimeter wave and optic (dual mode) transmission line and incorporation of combining and decombining filters enable the physical transmission lines to carry a multitude of independent signals. Both sections of the rotary joint can rotate independently, and the device can be pressurized for increased power handling and to minimize contamination of the optics. The various possible embodiments of the present application are less complex, have fewer parts, are more reliable, are less expensive, are more compact, and are easier to produce and assemble than the devices of the prior art.

SUMMARY OF THE INVENTION

A principal object of the present application is to provide a multi-transmission-line rotary joint using a new arrangement of structural elements in a simplified axial configuration to eliminate the need for a mounting plate or fixed member, making the device more compact, less complex, and easier to build than the earlier combined optical and microwave rotary joint. There is presently a demand for such a device. One embodiment of the present application is already in production and is a commercial success.

A further object is to create a device in which the second transmission line is fully integrated into the axial waveguide-to-coaxial line transition assembly and the coaxial rotary interface.

A still further object is to provide a rotary joint that produces the lowest possible insertion loss and the least amount of reflected energy in all of the transmission lines.

A still further object is to reduce vibration modulation and improve alignment in the optical interface.

A still further object is to provide a capability for pressurization to increase power handling capability in the radio frequency electromagnetic wave transmission line and to keep the optical interface as free of contaminants as possible.

A still further object is to expand the utility of the rotary joint's physical transmission lines with the incorporation of combining and decombining filters to propagate a multitude of channels of different frequencies or wavelengths simultaneously across the rotary interface.

BRIEF DESCRIPTION OF THE DRAWINGS

FIG. 5A is a sectional view of the axial waveguide-to-coaxial line transition detail aligned with the broad wall of the waveguide tubing, showing dimensional references for the design example.

FIG. 5B is a sectional view of the axial waveguide-to-coaxial line transition detail aligned with the narrow wall of the waveguide tubing, showing dimensional references for the design example.

FIG. 6 is an isometric view of the female inner coaxial line and transition assemblage.

FIG. 7 is an isometric view of the inner housing of the outer coaxial conductor.

FIG. 8A is a diagram and graph showing an example of gap loss due to end separation in a pair of butt-coupled optical fibers.

FIG. 8B is a diagram and graph showing an example of displacement loss due to lateral misalignment in an optical rotary coupling.

FIG. 9 is test data showing the measured insertion loss and return loss on the radio frequency electromagnetic wave transmission line (TX1) in the design example.

FIG. 10A shows two optical fibers in a butt-coupled configuration with dashed lines approximating the cone of light emitted from the fiber.

FIG. 10B shows a pair of optical fiber tapers achieving optical coupling with expansion and some collimation, with dashed lines approximating the coupled light ray trace.

FIG. 10C shows a pair of optical horns with a mirrored interior surface achieving optical coupling with expansion and some collimation, with dashed lines approximating the coupled light ray trace.

FIG. 10D shows a pair of dielectric horns with graded indexes of refraction achieving optical coupling with both beam expansion and collimation, with dashed lines approximating the coupled light ray trace.

FIG. 10E shows a pair of rod lenses achieving optical coupling with both beam expansion and collimation, with dashed lines approximating the coupled light ray trace.

FIG. 10F shows a pair of ball lenses achieving optical coupling with both beam expansion and collimation, with dashed lines approximating the coupled light ray trace.

FIG. 10G shows a pair of lenses illuminated by the cone-shaped light beam emitted from the ends of optical fibers achieving optical coupling with both beam expansion and collimation, with dashed lines approximating the coupled light ray trace.

FIG. 10H shows a pair of optical assemblies each comprising an angled fiber optic ferrule and a C-lens with an angled back, achieving optical coupling with both beam expansion and collimation, with dashed lines approximating the coupled light ray trace.

FIG. 10I shows a pair of mirrored Cassegrain assemblies achieving optical coupling with both beam expansion and collimation, with dashed lines approximating the coupled light ray trace.

FIG. 10J shows a pair of mirrored reflectors achieving optical coupling with both beam expansion and collimation, with dashed lines approximating the coupled light ray trace.

FIG. 11A shows combined millimeter waveguide and optical fiber transmission lines connected to a pair of coupling devices that employ an angled fiber optic ferrule and an angled C-lens to achieve coupling, with dashed lines approximating the coupled signal trace.

FIG. 11B shows combined millimeter waveguide and optical fiber transmission lines connected to a pair of coupling devices employing ball lenses to achieve coupling, with dashed lines approximating the coupled signal trace.

FIG. 11C shows combined millimeter waveguide and optical fiber transmission lines connected to a pair of coupling devices employing rod lenses to achieve coupling, with dashed lines approximating the coupled signal trace.

FIG. 11D shows combined millimeter waveguide and optical fiber transmission lines connected to a pair of coupling devices employing dielectric horns with graded indexes of refraction to achieve coupling, with dashed lines approximating the coupled signal trace.

FIG. 11E shows combined millimeter waveguide and optical fiber transmission lines connected to a pair of coupling devices employing a ball lens to illuminate a mirrored Cassegrain sub-reflector, which in turn illuminates the main mirrored Cassegrain reflector to achieve coupling, with dashed lines approximating the coupled signal trace.

FIG. 11F shows combined millimeter waveguide and optical fiber transmission lines connected to a pair of coupling devices employing optical fiber tapers to achieve coupling, with dashed lines approximating the coupled signal trace.

Figure 1:
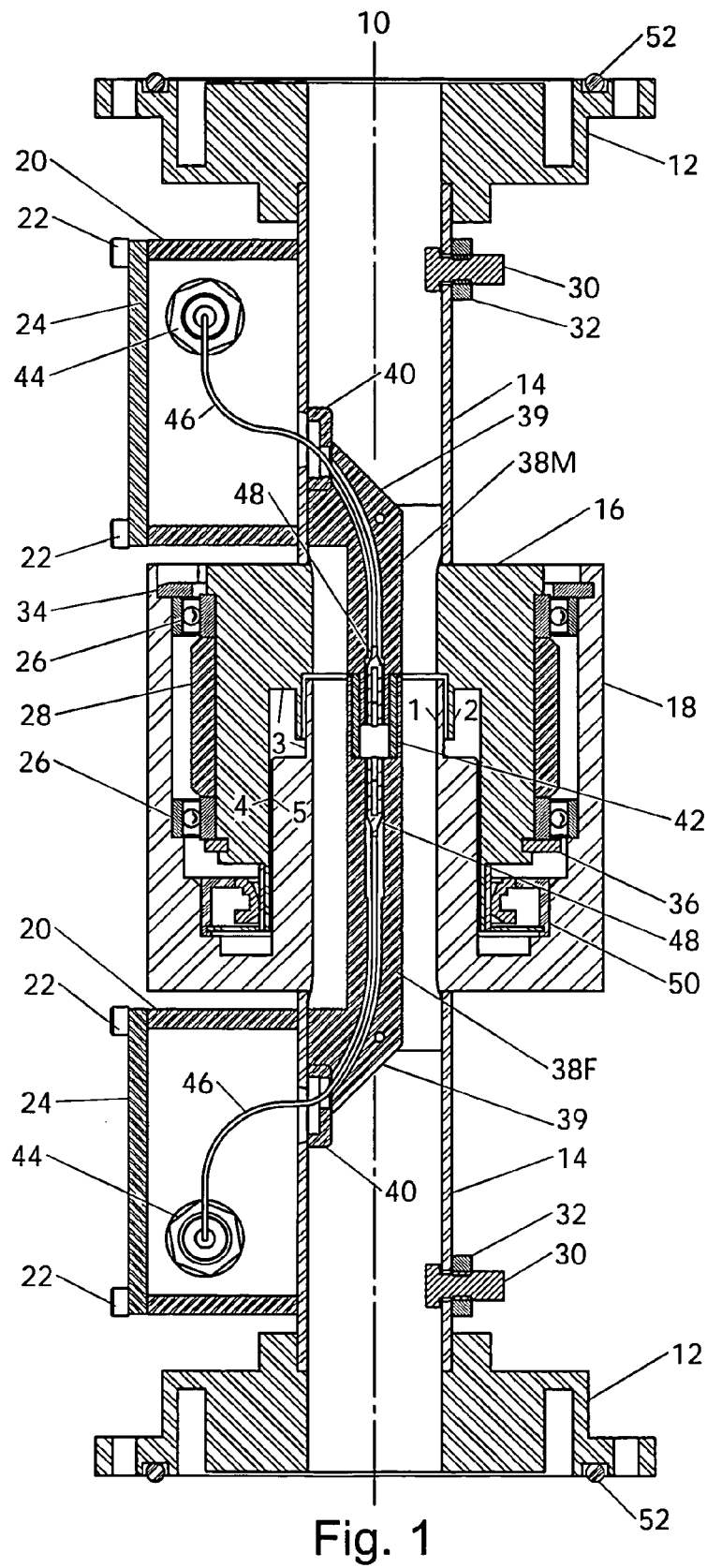
FIG. 1 is a longitudinal cross section view of one embodiment of the entire rotary joint, aligned with the narrow wall of the waveguide tubing.

| DRAWINGS - REFERENCE NUMERALS | |
|---|---|
| 1 | APPROX. 1/4 WAVELENGTH OVERLAP SURFACE OF HOUSING 18 |
| 2 | APPROX. 1/4 WAVELENGTH OVERLAP SURFACE OF HOUSING 16 |
| 3 | CHOKE CAVITY |
| 4 | APPROX. 3/4 WAVELENGTH OVERLAP SURFACE OF HOUSING 16 |
| 5 | APPROX. 3/4 WAVELENGTH OVERLAP SURFACE OF HOUSING 18 |
| 10 | LONGITUDINAL AXIS OF ROTATION |
| 12 | WAVEGUIDE FLANGE |
| 14 | WAVEGUIDE TUBING |
| 16 | INNER HOUSING |
| 18 | OUTER HOUSING |
| 20 | CONNECTOR BOX |
| 22 | SCREW |
| 24 | CONNECTOR BOX COVER |
| 26 | BEARING ASSEMBLY |
| 28 | BEARING ASSEMBLY SPACER |
| 30 | PRECISION IMPEDANCE MATCHING DEVICE |
| 32 | PRECISION MOUNTING DEVICE |
| 34 | SNAP RING RETAINER |
| 36 | BEARING RETAINER |
| 38F | FEMALE INNER COAXIAL LINE |
| 38M | MALE INNER COAXIAL LINE |
| 39 | INNER COAXIAL LINE TRANSITION ASSEMBLY |
| 40 | WAVEGUIDE HEIGHT REDUCING PLATE |
| 42 | DIELECTRIC SLEEVE BEARING |
| 44 | SECOND TRANSMISSION LINE CONNECTOR |
| 46 | SECOND TRANSMISSION LINE |
| 48 | OPTICAL COUPLING DEVICE |
| 50 | PRESSURE SEAL ASSEMBLY |
| 52 | FLANGE GASKET |
| 56 | MILLIMETER WAVEGUIDE TUBING |
| 58 | OPTICAL FIBER |

DETAIL DESCRIPTION OF THE INVENTION

First Embodiment

Figure 2:
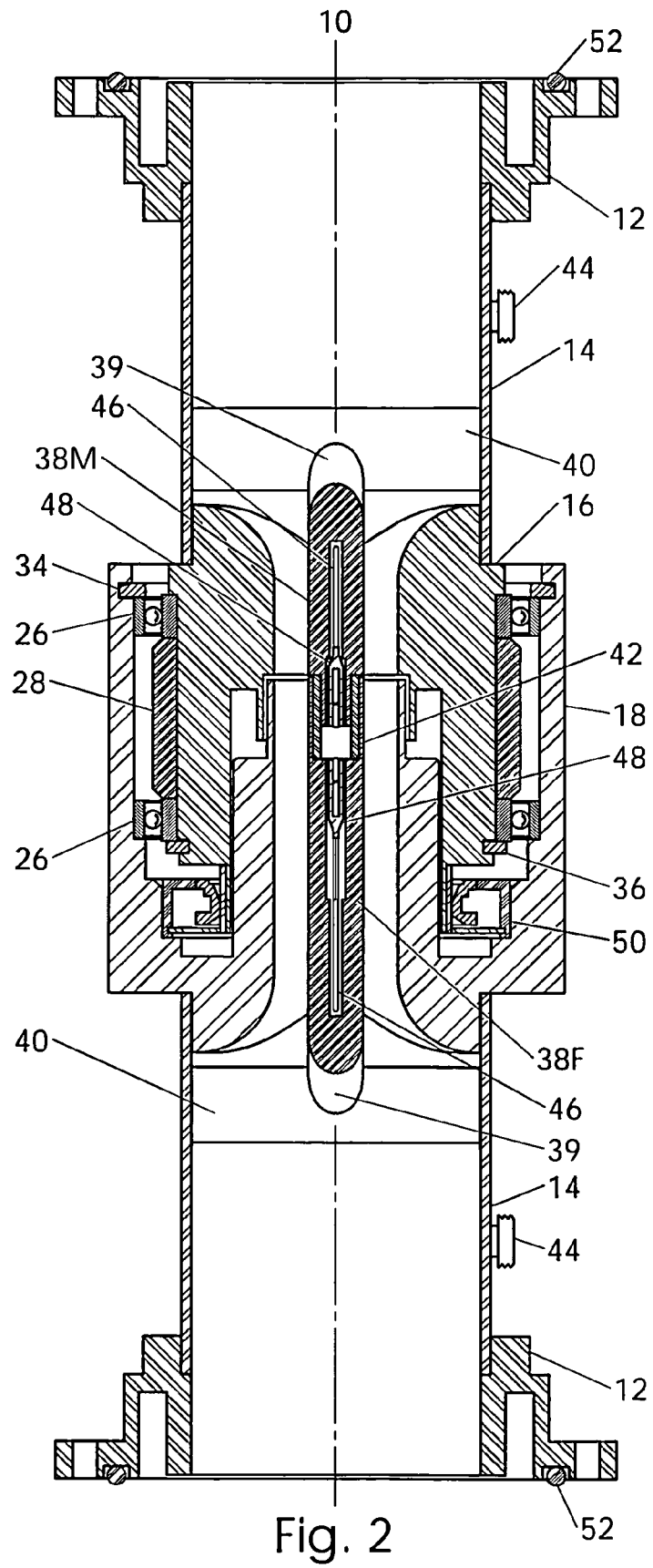
FIG. 2 is a longitudinal cross section view of one embodiment of the entire rotary joint, aligned with the broad wall of the waveguide tubing.
Figure 3:
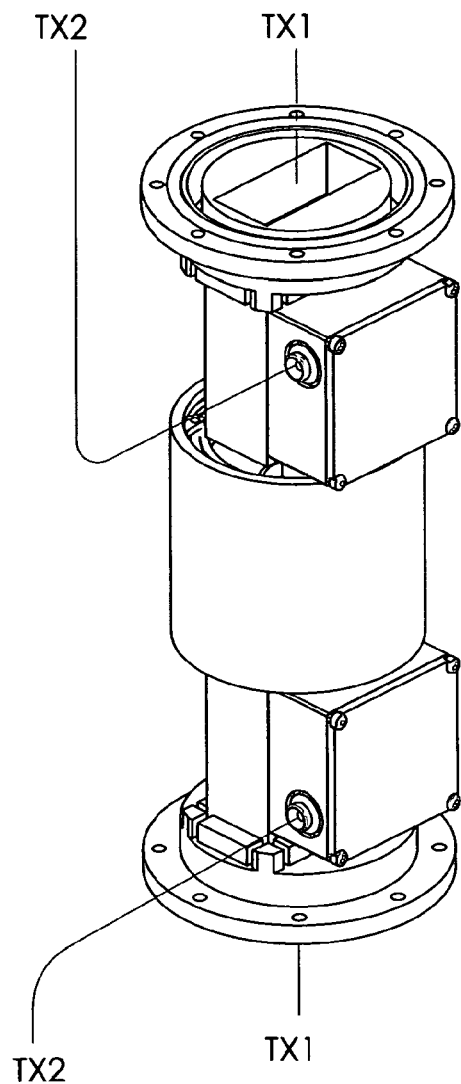
FIG. 3 is an isometric view of one embodiment of the rotary joint, showing connections for the physical transmission lines.

A preferred embodiment of the rotary joint is illustrated in FIG. 1 and FIG. 2. This embodiment is comprised of a radio frequency electromagnetic wave rotary transmission line (TX1) and a light wave rotary transmission line (TX2) built along a common rotational axis as shown in FIG. 3. Like features throughout the drawing figures are designated by the same reference label and may not be described in all drawing figures in which they appear.

Radio Frequency Electromagnetic Wave Rotary Transmission Line—Description

In this embodiment, the radio frequency electromagnetic wave transmission line is comprised of a pair of waveguide-to-coaxial line transition assemblies that are connected to a coaxial rotary interface. Each transition assembly has a waveguide transmission line and a waveguide-to-coaxial line transitioning device that transitions to a coaxial transmission line having concentric inner and outer conductors. The rotary interface section has a pair of coaxial transmission lines comprised of concentric inner and outer conductors that are affixed to each side of the rotary interface and aligned with the axis of rotation. The coaxial transmission line sections of the waveguide-to-coaxial line transition assemblies are connected to the coaxial transmission lines of the rotary interface. The coaxial rotary interface comprises non-contacting overlapping surfaces that couple electromagnetic energy across the interface. The coaxial rotary interface is supported by a bearing assembly that maintains alignment during rotational movement. The assembled structure of the rotary joint on each side of the rotary interface is capable of fully independent rotation.

Waveguide to Coaxial Line Transition Assembly

Figure 4:
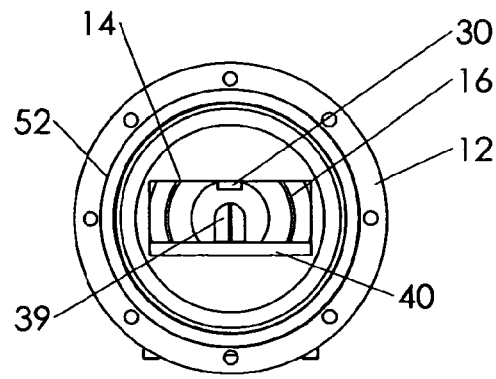
FIG. 4 is an end view of one embodiment of the rotary joint, showing the inner coaxial line transition assembly, the precision impedance matching device, and the waveguide flange with gasket pressure seal.

As shown in FIG. 1, a waveguide flange 12 such as those that can be supplied by American Radar Components Inc. of Denville, N.J., is conductively and fixedly attached to a section of waveguide tubing 14 such as that which can be supplied by A.T. Wall Company of Warwich, R.I., and centered about a common longitudinal axis of rotation 10. Flange 12 contains a commercially available flange gasket 52 as shown in FIG. 1 and FIG. 4. A precision impedance matching device 30 is inserted through a hole drilled along the center line of one of the broad walls of waveguide tubing 14. Impedance matching device 30 is fixed in place with a precision mounting device 32 and adjusted for lowest reflected electromagnetic energy at the desired frequency.

FIG. 6 shows a completed assemblage of the inner coaxial conductor. This assemblage is constructed of several machined parts with an interior hollow pathway that are conductively and fixedly attached together to form a single structural unit. The assemblage in FIG. 6 comprises a waveguide height reducing plate 40, an inner coaxial line transition assembly 39, and a female inner coaxial line 38F. The assemblage shown with female inner coaxial line 38F in FIG. 6 is one of three elements that comprise the inner coaxial conductor. The second element of the inner coaxial conductor is an assemblage constructed in the same manner as FIG. 6 with a male inner coaxial line 38M. As shown in FIG. 1, male inner coaxial line 38M is sized to insert matingly into a corresponding portion of female inner coaxial line 38F separated by the third element, a dielectric sleeve bearing 42.

The female inner coaxial conductor assemblage shown in FIG. 6 is conductively and fixedly attached to the broad wall of a first piece of waveguide tubing 14 as shown in FIG. 1 to form a female waveguide-to-coaxial line transition assembly.

The attachment of the female waveguide-to-coaxial line transition assembly to waveguide tubing 14 is oriented such that waveguide height reducing plate 40 is 90° to the longitudinal axis of waveguide 14 as shown in FIG. 5A. The corresponding male inner coaxial conductor assemblage is conductively and fixedly attached to a second piece of waveguide tubing 14 to form a male waveguide-to-coaxial line transition assembly.

Outer Coaxial Conductor Assembly

The outer coaxial conductor assembly of the coaxial transmission line has two main parts as shown in FIG. 1, an outer housing 18 and an inner housing 16, which are generally tubular in shape and fit together concentrically. The inner and outer housings each have an interface attachment end and an input/output connection end. The interface end of inner housing 16 is sized to insert matingly into a cavity in the interface end of outer housing 18. The inner tube and overlapping surfaces created by the mating of the inner and outer housings forms the outer coaxial conductor.

A commercially available pressure seal assembly 50 is placed in the bottom of the mating cavity in outer housing 18 as shown in FIG. 1 and FIG. 2. Two commercially available ball bearing assemblies 26 are press-fit onto inner housing 16 separated by a bearing assembly spacer 28 as shown in FIG. 1. The innermost bearing assembly is captured and held in place with a bearing retainer 36. The interface attachment ends of inner housing 16 and outer housing 18 are mated together so that pressure seal assembly 50 rubs against inner housing 16 providing seal to prevent air or other gas from entering or escaping from the rotary interface. Inner housing 16 and outer housing 18 overlap for a distance of approximately one-quarter wavelength at the operating frequency at locations 1 and 2, and overlap for a distance of approximately three-quarters of a wavelength at the operating frequency at locations 4 and 5 as shown in FIG. 1. In addition, the mated inner and outer housings form a choke cavity 3, a small, confined open area between the inner and outer housings that has an overall length of approximately one-quarter wavelength at the operating frequency and prevents leakage of energy from the outer coaxial conductor. The mated inner and outer housings and the outermost bearing assembly are held in position by a snap ring retainer 34.

Coaxial Rotary Assembly

The coaxial section of the male waveguide-to-coaxial line transition is introduced into the outer coaxial conductor assembly through the tubular opening in the input/output connection end of inner housing 16 that appears in FIG. 7. The coaxial section of the female waveguide-to-coaxial line transition assembly is similarly introduced into the outer coaxial conductor assembly through the tubular opening in the input/output connection end of outer housing 18 on the opposite side of the rotary joint. Male inner coaxial line 38M is inserted matingly into the corresponding portion of female inner coaxial line 38F, forming the inner coaxial conductor of the rotary joint as shown in FIG. 1 and FIG. 2. The mated parts of the inner coaxial conductor are separated for the entire length of their overlap by dielectric sleeve bearing 42. The length of the overlap of male inner coaxial line 38M and female inner coaxial line 38F in the interface is approximately one-quarter wavelength at the operating frequency. Dielectric sleeve bearing 42 will decrease the physical length of the quarter wavelength dimension by the square root of the dielectric constant of sleeve bearing 42. The inner coaxial conductor formed by the mated male and female inner coaxial lines and the dielectric sleeve is aligned with and centered about axis of rotation 10. FIG. 4 is an isometric end view from waveguide flange 12 and flange gasket 52 through tubing 14 to the waveguide-to-coaxial line transition, illustrating how the axial positioning of the inner coaxial conductor is achieved with waveguide height reducing plate 40 and inner coaxial line transition assembly 39.

As shown in FIG. 1 and FIG. 2, waveguide tubing 14 of the male waveguide-to-coaxial line transition assembly is conductively and fixedly attached to the input/output connection end of inner housing 16 on one side of the rotary coaxial section. The waveguide tubing of the female waveguide-to-coaxial line assembly is conductively and fixedly attached to the input/output connection end of outer housing 18 on the opposite side of the rotary coaxial section.

The housings, flanges, impedance matching devices, mechanical structural elements, waveguide and coaxial transmission lines, and other structural parts of the rotary joint can be built of many different suitable conductive materials. The design example was constructed primarily of aluminum. Individual piece parts that are not commercially available can be fabricated using standard machining, casting, stamping or other suitable manufacturing processes. The parts can be attached to each other with any suitable process that forms a strong, conductive, permanent joint. An aluminum dip-brazing process such as that performed by Coleman Microwave, Edinburg, Va. was used in the design example.

The device of the present application can be built for a wide range of radio frequencies. FIG. 5A and FIG. 5B are sectional views of the waveguide-to-coaxial line transition assembly. FIG. 5B also illustrates a functional angle of 45° for the slope of inner coaxial transition assembly 39 with respect to the longitudinal axis. Reference letters for the respective dimensions of the design example are listed below.

| FIG. 5A & 5B Dimensions in Inches | | | | | |
|---|---|---|---|---|---|
| A | 1.872 | B | 0.536 | C | 0.096 |
| D1 | 0.807 | D2 | 0.353 | E | 0.872 |
| F | 0.102 | G | 0.156 | H | 0.910 |
| I | 0.900 | J | 0.281 | R | 0.500 |

Light Wave Rotary Transmission Line—Description

As shown in FIG. 1, a connector box 20 is conductively and fixedly attached to the broad wall of waveguide tubing 14 of each waveguide-to-coaxial line transition assembly. A second transmission line connector 44 is attached through one side of each connector box. A second transmission line 46 is attached to each connector 44. In this embodiment, the second transmission line is an optical fiber. A cover plate 24 is affixed in place on connector box 20 with screws 22.

The optical fiber transmission line attached to connector 44 on the male waveguide-to-coaxial line transition assembly runs through an aperture in the side of waveguide tubing 14 that leads into the hollow pathway through waveguide height reducing plate 40, inner coaxial line transition assembly 39, and male inner coaxial line 38M. The optical fiber transmission line attached to connector 44 on the female waveguide-to-coaxial line transition assembly runs through an aperture in the side of waveguide tubing 14 that leads into the hollow pathway through waveguide height reducing plate 40, inner coaxial line transition assembly 39, and female inner coaxial line 38F on the opposite side of the rotary interface. A pair of optical coupling devices 48 are inserted, one each, into the hollow pathway of both the male and female inner coaxial lines so that the optical coupling ends of the optical coupling devices are facing each other across the rotary interface, centered about and aligned with the axis of rotation, forming an optically coupled interface. The attachment ends of the optical coupling devices are transmissively and fixedly attached to optical fiber transmission Dries 46.

OPERATION

First Embodiment

Radio Frequency Rotary Transmission Line—Operation

In FIG. 1, the operation of the radio frequency rotary transmission line begins with an electromagnetic wave propagating through waveguide tube 14. The waveguide-to-coaxial line transition assembly converts the electromagnetic energy from propagation through the waveguide transmission line to propagation through a coaxial transmission line that has concentric inner and outer coaxial conductors. The conversion from high-impedance waveguide to lower-impedance coaxial line is accomplished first by waveguide height-reducing plate 40 that lowers the waveguide impedance, followed by the gradual introduction of the inner coaxial conductor by inner coaxial line transition assembly 39. Inner coaxial line transition assembly 39 acts as a pick-up loop with one side attached to the waveguide outer coaxial conductor and one side attached to the inner coaxial conductor, capturing the energy from the waveguide for delivery into the coaxial transmission line. The desired result is to transfer all of the energy from the waveguide tubing to the coaxial line without loss due to reflected energy. Precision matching device 30 functions to minimize the small amount of energy reflected by the structure of height-reducing plate 40 and inner coaxial line transition assembly 39. The amount of penetration of precision matching device 30 into waveguide 14 is adjusted for minimum reflected energy.

The primary rotary structure is coaxial. The coaxial portion begins and ends at the imaginary planes described by the outermost ends of the inner and outer coaxial conductors. These imaginary planes can also be described as the input/output ports. These input/output ports are interchangeable, hence bi-directional in nature.

The radio frequency electromagnetic energy conducted through the coaxial transmission line is propagated and coupled across a rotary interface that is supported and held in alignment by bearing assemblies. In the radio frequency rotary transmission line, two overlapping areas form the rotary interface: one in the inner coaxial conductor, and one in the outer coaxial conductor. The gaps between the overlapping areas provide a low impedance path for the radio frequency electromagnetic energy to propagate and couple freely across the overlapping gaps, hence freely across the rotary interface.

The interface of the inner coaxial conductor is formed by the overlapping, mated surfaces of female inner coaxial line 38F and male inner coaxial line 38M separated by dielectric sleeve bearing 42.

The interface of the outer coaxial conductor is formed by overlap surfaces 1 and 2 between inner housing 16 and outer housing 18. Some of the radio frequency electromagnetic energy leaks past the gap between overlap surfaces 1 and 2 into choke cavity 3. The choke cavity short-circuits most of the radio frequency electromagnetic energy that has leaked in. Any radio frequency electromagnetic energy leaking past this point proceeds into the narrow gap between the inner and outer housings located at overlap surfaces 4 and 5. Very little radio frequency electromagnetic energy leaks past overlap surfaces 4 and 5 to escape from the outer coaxial conductor.

Inner housing 16 and outer housing 18 are capable of rotating freely and independently about the axis of rotation on bearing assemblies 26, which are separated by bearing assembly spacer 28. The bearing assemblies maintain the alignment of the rotary joint during rotational movement. Separation of the bearing assemblies produces a precision rotatable assembly capable of taking lateral loading with minimal deflection off the axis of rotation.

After propagation across the rotary interface, the radio frequency electromagnetic energy is re-converted from coaxial transmission to waveguide transmission by a second waveguide-to-coaxial line transition assembly at the opposite end of the rotary joint, which reverses the process described above and feeds the energy into to a second waveguide transmission line.

Flange 12 and flange gasket 52, as shown in FIG. 4, provide a pressure seal to prevent air or gas from entering or escaping when this embodiment of the rotary joint is installed in a pressurized or sealed system. This seal works in conjunction with pressure seal assembly 50 (FIG. 1) in the outer coaxial conductor to allow pressurization of the rotary joint that improves high power operation and keeps the optical interface as clean as possible.

The design example for this embodiment operates at 5.4 to 5.9 GHz. FIG. 9 shows actual measured test data for the radio frequency electromagnetic wave transmission line TX1. The graph in FIG. 9 shows the insertion loss and the return loss vs. frequency from 5.4 to 5.9 GHz. The upper line on the graph shows insertion loss of less than 0.1 dB, and the lower line shows a return loss of better than −25 dB over the entire frequency range. With pressurization of 15 psi, this transmission line in the design example easily handled 1 megawatt peak without any electrical breakdown.

Light Wave Rotary Transmission Line—Operation

In FIG. 1, light energy is introduced into second transmission line 46, which in this embodiment is optical fiber. The optical fiber originates at connector 44 and propagates the light energy through the transmission line in the interior of the inner coaxial conductor to optical coupling device 48, which is attached to the interior of the inner coaxial conductor on one side of the rotary interface aligned with and centered on the axis of rotation. The optical coupling device expands and collimates the light beam, which propagates across the gap of the rotary interface and is coupled into a second optical coupling device attached to the interior of the inner coaxial conductor on the other side of the rotary interface directly opposite, and aligned with and centered on the axis of rotation. The second optical coupling device contracts the expanded, collimated light beam and feeds it into a second optical fiber transmission line in the interior of the opposing section of the inner coaxial conductor. The second optical fiber transmission line propagates the light energy to a second connector at the opposite end of the rotary joint. The second transmission line, being routed through the inner coaxial conductor, is fully integrated into the rotational assembly.

Optical Coupling Considerations

There are many devices that can optically couple light energy across a rotary interface. Some are more efficient than others. FIG. 8A shows two optical fibers in a butt-coupled arrangement. S indicates the amount of end separation between the two optical fibers. The light beam expands in a cone shape from the end of one optical fiber toward the opposing optical fiber as shown by the dashed lines. A significantly reduced amount of the light energy is coupled to the opposing optical fiber due to the uncontrolled spread of the light energy. Only the amount of light that falls directly on the receiving end of the opposing optical fiber is coupled, making for unacceptably high loss. This is shown graphically in the lower part of FIG. 8A. As end separation S increases, the gap loss increases. This method is not particularly useful for an optical rotary interface. To couple light from one optical fiber to another efficiently, a device must be employed to expand and then collimate the light beam in the direction of a similar opposing device, which then reverses the process and couples the light energy into the opposing optical fiber.

FIG. 8B illustrates loss between two collimated light beams due to lateral misalignment. D indicates the amount of lateral misalignment of the optical fibers. This figure illustrates the importance of lateral alignment for efficient transfer of light. The graph in the lower part of FIG. 8B shows that as the lateral misalignment D increases, the displacement loss increases rapidly. Less of the collimated light falls on the adjacent optical interface to be captured, causing increased loss.

Another type of loss that can degrade the signal across the optical interface is reflective loss caused by a change from one refractive index to another. Two very effective methods of minimizing reflective loss are use of anti-reflective coatings (typically thin coatings of dielectric material), and angling reflective surfaces so that the reflection does not fall back into the fiber optic transmission line. Even greater reduction of reflection is achieved by combining these two methods.

FIG. 10H shows a pair of optical assemblies each comprising an angled fiber optic ferrule and a C-lens with an angled back, achieving optical coupling with both beam expansion and collimation. This optical interface device is primarily used with a single mode fiber, and employs both angled reflective surfaces and anti-reflective coatings to make for a very efficient, low-reflection optical coupling. This device was used in the design example, but other devices are suitable.

FIG. 10A shows a pair of butt coupled fibers that have no collimation properties. The light expands in a cone shape and produces high loss across the interface.

FIGS. 10B through 10J are examples of optical coupling devices comprising lenses, optical tapers, horns, and mirrored reflectors that expand and collimate the light beam emitted from the end of an optical fiber as indicated by the dashed lines.

FIG. 10B shows a pair of optical fiber tapers achieving optical coupling with expansion and some collimation.

FIG. 10C shows a pair of optical horns with a mirrored interior surface achieving optical coupling with expansion and some collimation.

FIG. 10D shows a pair of dielectric horns with graded indexes of refraction achieving optical coupling with both beam expansion and collimation.

FIG. 10E shows a pair of rod lenses achieving optical coupling with both beam expansion and collimation.

FIG. 10F shows a pair of ball lenses achieving optical coupling with both beam expansion and collimation.

FIG. 10G shows a pair of lenses illuminated by the cone-shaped light beam emitted from the ends of optical fibers achieving optical coupling with both beam expansion and collimation.

FIG. 10I shows a pair of mirrored Cassegrain assemblies achieving optical coupling with both beam expansion and collimation.

FIG. 10J shows a pair of mirrored reflectors achieving optical coupling with both beam expansion and collimation.

Light beam expansion and collimation devices such as those in FIGS. 10B through 10J, as well as the individual components of such devices, are available commercially.

Yet another type of loss can be created by misalignment of the light beams due to mechanical play in the bearing assemblies. This misalignment can also generate vibration modulation. The problem is minimized in this embodiment by separating the two bearing assemblies with bearing assembly spacer 28 and adding a third bearing, dielectric sleeve bearing 42, making for a mechanically stable rotatable assembly.

Second Embodiment

Description

In a second embodiment, the rotary joint is constructed in essentially the same manner as the first embodiment described above and shown in FIG. 1 and FIG. 2. The difference is that the second transmission line 46 of FIGS. 1 and 2 is, in the second embodiment, a combined or dual-mode fiber optic and millimeter waveguide transmission line. As shown in FIG. 11A, an optical fiber 58 is run through the inside of a length of millimeter waveguide tubing 56 forming a dual-mode transmission line. Both the optical fiber and the millimeter waveguide are fixedly attached to the attachment end of a coupling device 48 (e.g. see FIGS. 1 and 2).

A pair of dual-mode transmission lines are run from connectors through the hollow pathway in the interior of the inner coaxial conductor and are permanently affixed with their respective coupling devices facing each other across the rotary interface, aligned with and centered on the axis of rotation as more fully described in the first embodiment above.

Optical fiber 58 inside millimeter waveguide tubing 56 exits through a tiny aperture in the wall of the millimeter waveguide at any convenient location to separate the millimeter wave and light wave transmission lines. To prevent leakage of millimeter wave energy, the aperture through which optical fiber 58 exits millimeter waveguide 56 is sealed with a suitable conductive material.

Second Embodiment

Operation

During testing of the design example of the first embodiment, an unexpected result was discovered. Very high frequency microwaves in the millimeter wave range were found to be propagating through the hollow pathway in the inner coaxial line, which was acting as a waveguide transmission line. The millimeter waves also propagated through optical coupling device 48 (FIGS. 1 & 2) and across the optical rotary interface. This discovery proved the capability of propagating different types or modes of signals through second transmission line TX2 (FIG. 3). Both light wave and millimeter wave signals were propagating through the second transmission line bi-directionally and simultaneously, resulting in a dual-mode rotary transmission line. The transmission of the millimeter wave signal was improved with the installation of millimeter waveguide tubing over the fiber optic transmission line to create a dual-mode transmission line.

Several suitable coupling devices for dual-mode optical and millimeter wave operation comprising lenses, optical tapers, horns, and mirrored reflectors are shown in FIGS. 11A through 11F with dashed lines approximating the coupled signal trace.

FIG. 11A shows combined millimeter waveguide and optical fiber transmission lines connected to a pair of coupling devices that employ an angled fiber optic ferrule and an angled C-lens to achieve coupling.

FIG. 11B shows combined millimeter waveguide and optical fiber transmission lines connected to a pair of coupling devices employing ball lenses to achieve coupling.

FIG. 11C shows combined millimeter waveguide and optical fiber transmission lines connected to a pair of coupling devices employing rod lenses to achieve coupling.

FIG. 11D shows combined millimeter waveguide and optical fiber transmission lines connected to a pair of coupling devices employing dielectric horns with graded indexes of refraction to achieve coupling.

FIG. 11E shows combined millimeter waveguide and optical fiber transmission lines connected to a pair of coupling devices employing a ball lens to illuminate a mirrored Cassegrain sub-reflector, which in turn illuminates the main mirrored Cassegrain reflector to achieve coupling.

FIG. 11F shows combined millimeter waveguide and optical fiber transmission lines connected to a pair of coupling devices employing optical fiber tapers to achieve coupling.

The dual-mode second transmission line, being routed through the inner coaxial conductor, is fully integrated into the rotational assembly.

The millimeter wave portion of the dual-mode transmission line works best when the signal fed into millimeter waveguide tubing 56 (FIG. 11A) is circularly polarized. A suitable combination of waveguide diameter and the type of coupling device may be determined through prototype testing. The optical fiber inside the millimeter waveguide has very little effect on or interaction with the millimeter wave transmission, and there is minimal, if any, interaction between the optical fiber and millimeter wave signals. Waveguide transmission theory is discussed in *Waveguide Handbook*, N. Marcuvitz, (London: Peter Peregrinus Ltd. 1993), pp. 60-90.

ADDITIONAL EMBODIMENTS

The number of physical transmission lines in a rotary joint is typically limited due to mechanical constraints. However, each physical transmission line in a rotary joint typically has a frequency bandwidth for efficient transmission of energy within the design range. Any number of different frequencies or wavelengths within the design bandwidth can be used for independent, bi-directional signals with a manifold of collaterally arrayed combining and decombining filters connected to and incorporated into the transmission line on both sides of the rotary interface. The signals of differing frequencies or wavelengths pass through the respective filters and are combined into a common transmission line for propagation across the rotary interface. The combined signals propagate across the rotary interface via the common transmission line and then are separated or decombined by the respective filters on the opposite side of the rotary interface. These filters only allow the desired frequency or wavelength to pass through and reject others.

Figure 12A:
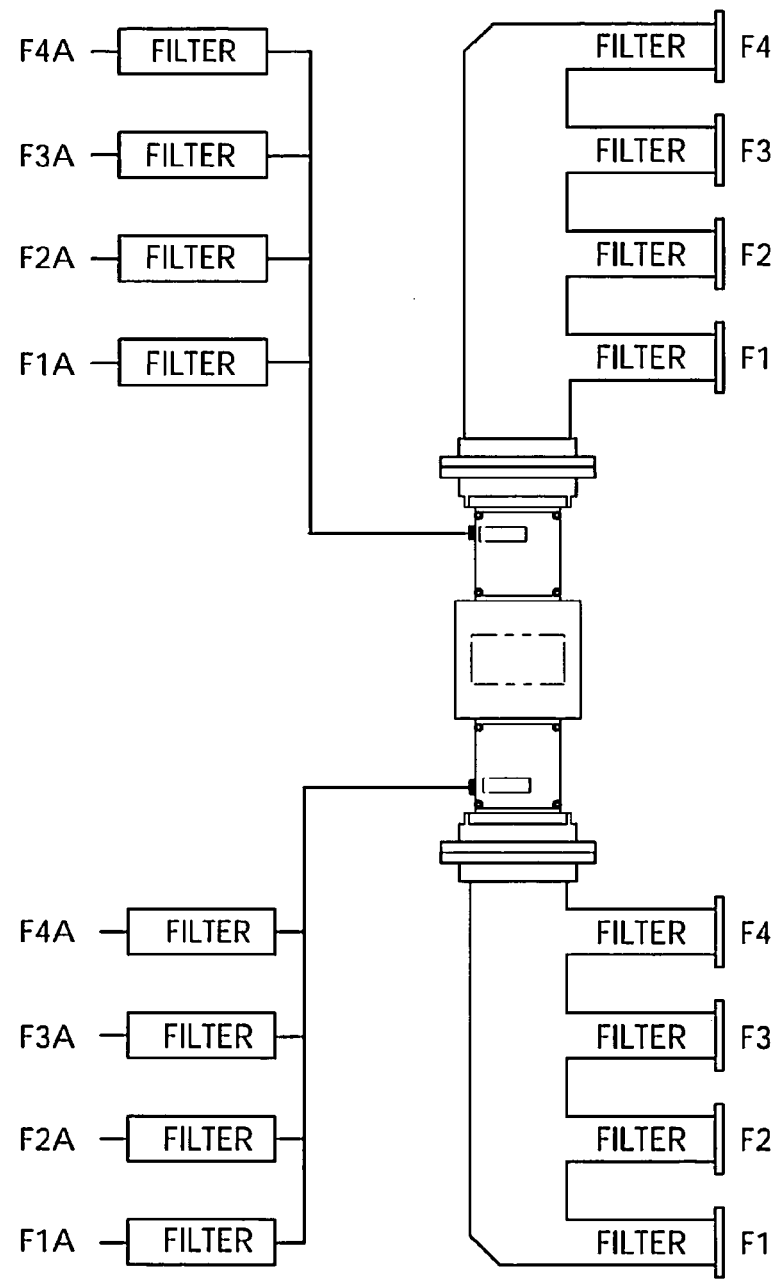
FIG. 12A shows the rotary joint with the incorporation of combining and decombining filters on the radio frequency electromagnetic wave transmission line and the light wave transmission line to propagate a multitude of channels of different frequencies or wavelengths across the rotary interface.

FIG. 12A shows a diagram of the manner in which combining and decombining filters may be added to the transmission line of a rotary joint of the first embodiment described above to gain additional channels on both the radio frequency and light wave physical transmission lines. F1, F2, F3 & F4 represent signals of different electromagnetic wave radio frequencies that are combined into a common radio frequency electromagnetic wave transmission line, and then are decombined after transmission through the rotary joint. F1A, F2A, F3A,& F4A represent signals of different wavelengths of light that may be combined and decombined in the same manner on the light wave transmission line.

Figure 12B:
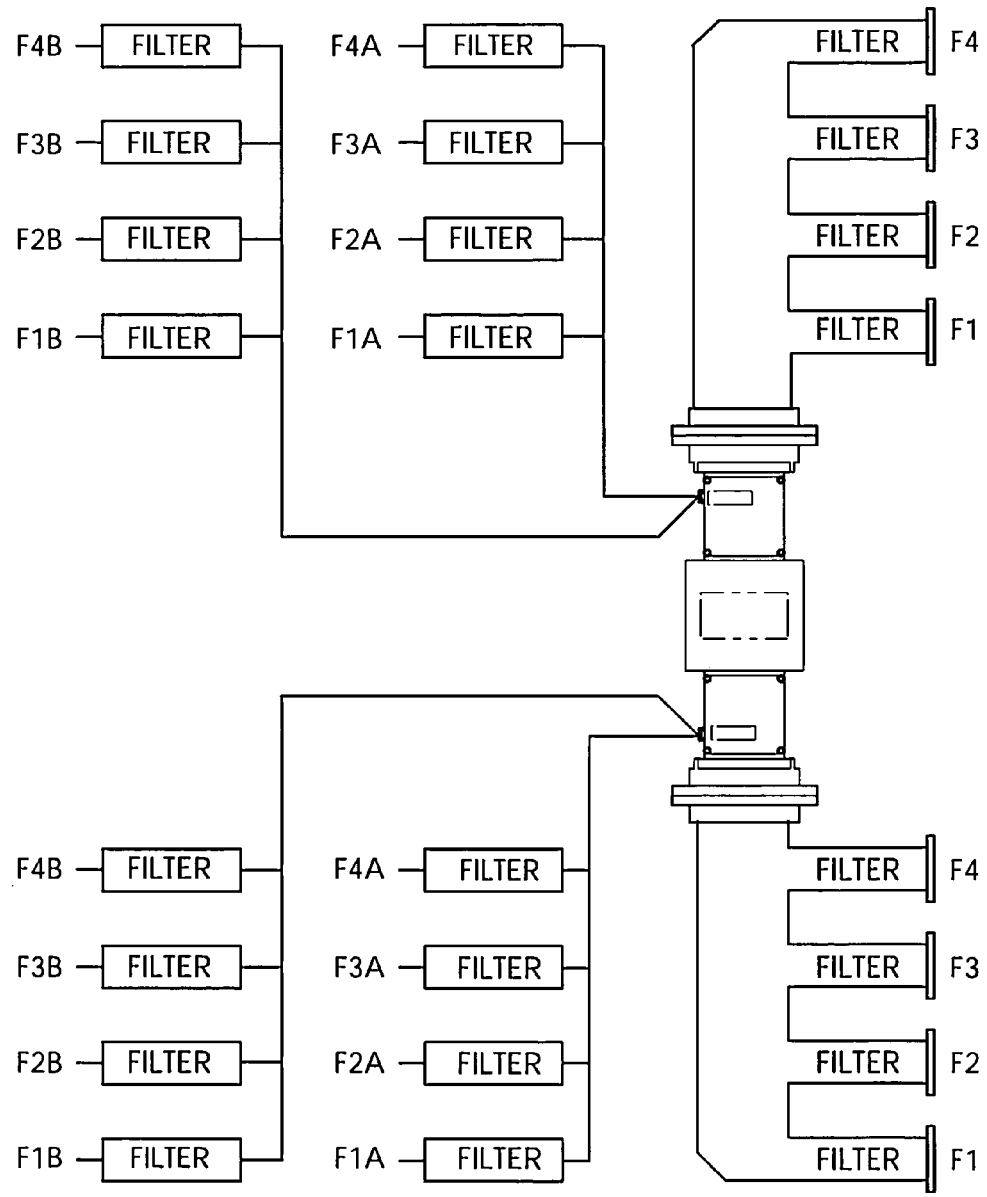
FIG. 12B shows the rotary joint with the incorporation of combining and decombining filters on the radio frequency electromagnetic wave transmission line, the light wave transmission line, and the millimeter wave transmission line to propagate a multitude of channels of different frequencies or wavelengths across the rotary interface.
Figure 13:
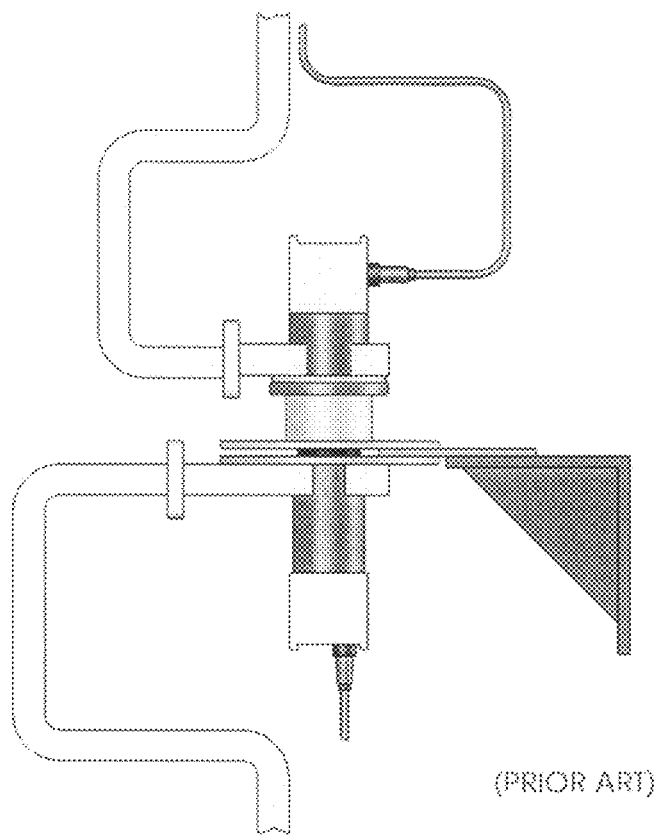
FIG. 13 shows an illustration of the prior art combined microwave and optic rotary joint of U.S. Pat. No. 5,140,289 illustrating the mounting plate for the "fixed part" and the perpendicular waveguide transmission line connections.
Figure 14:
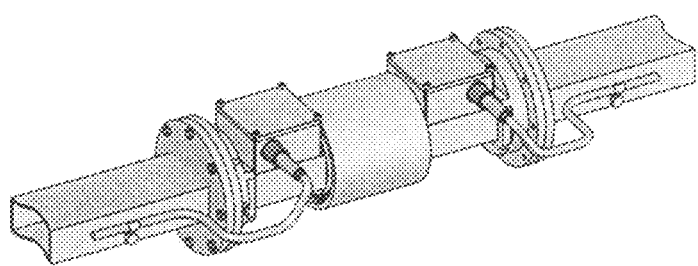
FIG. 14 shows an embodiment of the present application connected to axial waveguide transmission lines, illustrating the simplified, more compact design and arrangement of elements and the elimination of the mounting plate.

All of the principals explained for FIG. 12A apply to FIG. 12B. In FIG. 12B, millimeter wave filters are added to the millimeter waveguide of the dual-mode transmission line of a rotary joint according to the second embodiment described above. F1B, F2B, F3B & F4B represent millimeter wave signals of different frequencies that are combined into a common millimeter wave transmission line, and then are decombined after transmission through the rotary joint. In this additional embodiment, second transmission line 46 is dual-mode to accommodate both millimeter wave and light wave transmission lines.

FIG. 12A and FIG. 12B show an example of four combining and decombining filters on each transmission line, but any practical number of filters may be used. The filters may be installed at any convenient point along the transmission line between the signal sources and the rotary joint. Such combining and decombining filters are commercially available for radio frequency electromagnetic wave, millimeter wave, and light wave signals.

CONCLUSION, RAMIFICATIONS, AND SCOPE

Accordingly, the reader will see that the axial configuration of the various possible embodiments of the rotary joint of the present application results in a simpler, more compact device that is lighter in weight, self-supporting without the need for a mounting plate or a stationary member, has fewer different parts, and is easier to manufacture and assemble than the prior art device. Both sections of the rotary joint of the present application are capable of fully independent rotation. The waveguide-to-coaxial line transition assembly employs a precision impedance matching device to minimize reflected energy, which is an improvement over the prior art. The second transmission line is fully integrated into the waveguide-to-coaxial line transitions and the rotary interface, which is an improvement over the prior art. The rotary joint of the present application can be pressure sealed for increased power handling and to keep the optical elements as free of contaminants as possible. Use of anti-reflection technologies in the optical coupling devices improves performance in the light wave transmission line. The device of the present application uses a precision triple bearing assembly to minimize any vibration modulation in the rotary interface. The second transmission line can also perform in two modes simultaneously with the novel combination of a combined millimeter waveguide and fiber optic transmission line and a combined millimeter wave and optical coupling device. Another novel combination is the incorporation of combining and decombining filters, whereby the rotary joint's physical transmission lines can propagate a multitude of channels of different frequencies or wavelengths simultaneously across the rotary interface.

While the above description contains many specificities, these should not be construed as limitations on the scope, but rather as an exemplification of several preferred embodiments thereof. Many other variations are possible. For example, a variety of optical coupling devices can be used to create the optical interface. The rotary joint can be built for a wide range of frequencies. The device can be constructed from a wide range of conductive materials. Any practical number of combining and decombining filters may be incorporated into the radio frequency electromagnetic wave, millimeter wave, and light wave transmission lines to increase the number of available channels.

Accordingly, the scope should be determined not by embodiments illustrated, but by the appended claims and their legal equivalents.

I claim:

1. An axially configured rotary joint containing two sections that can be mechanically rotated independently with respect to each other on a common axis of rotation during propagation of radio frequency electromagnetic waves and light waves across a single common rotary interface plane, each section comprising:
   a) a radio frequency electromagnetic wave rotary transmission line including:
      i) a pair of coaxial transmission lines, each coaxial transmission line comprised of a concentric inner and outer coaxial conductor, each said coaxial transmission line including a rotary interface attachment end and an input/output port end;
      ii) said rotary interface attachment ends of said pair of coaxial transmission lines affixed on opposite sides of said common rotary interface plane such that said rotary attachment ends of said coaxial transmission lines are facing each other across said common rotary interface plane and aligned on said common axis of rotation;
      iii) a means for coupling electromagnetic wave energy across the common rotary interface plane;
      iv) a means for permitting rotational movement about the axis of rotation; and
      v) a means for maintaining precision alignment including a dielectric sleeve bearing between said rotary attachment ends of said inner coaxial conductors of said pair of coaxial transmission lines;
   and
   b) a light wave rotary transmission line including:
      i) a pair of optical fiber transmission lines, each optical fiber transmission line running through an interior pathway in said inner coaxial conductor of a corresponding one of said coaxial transmission lines,
      ii) a pair of optical coupling devices, each optical coupling device including a rotary interface attachment end and a transmission line attachment end,
      iii) said pair of optical fiber transmission lines being transmissively and fixedly attached to said transmission line attachment ends of a corresponding one of said pair of optical coupling devices,
      iv) each said optical coupling device being positioned and affixed within said interior pathway of said inner coaxial conductor of a corresponding one of said coaxial transmission lines so that said rotary interface attachment ends of each of said optical coupling devices are facing each other across said common rotary interface plane and aligned with said common axis of rotation.

2. The rotary joint of claim 1 further including:
   a) a pair of waveguide-to-coaxial line transition assemblies each comprising a waveguide transmission line end and a coaxial transmission line end, said coaxial transmission line end containing inner and outer conductors;
   b) said inner and outer conductors of said coaxial transmission line ends of each of said waveguide-to-coaxial line transition assemblies being conductively and fixedly attached to said inner and outer coaxial conductors of the input/output port ends of said coaxial transmission lines of said rotary joint and aligned on said common axis of rotation, whereby the conductive and fixed attachments function as a closed-circuit loop.

3. The rotary joint of claim 2 wherein each of said waveguide-to-coaxial line transition assemblies includes a means for precision impedance matching comprising an adjustable device of suitable conductive material extending into the waveguide end of each of said waveguide-to-coaxial line transition assemblies, whereby reflection of electromagnetic energy in said radio frequency electromagnetic wave rotary transmission line is minimized.

4. The rotary joint of claim 2 wherein said waveguide transmission line end of each of said waveguide-to-coaxial line transition assemblies includes a waveguide flange and flange gasket, whereby said rotary joint may be fixedly and conductively attached to a waveguide transmission line.

5. The rotary joint of claim 2 wherein each of said optical fiber transmission lines passes through said interior pathway in said inner conductor of a corresponding one-of said waveguide-to-coaxial line transition assemblies contiguous to said interior pathway of said corresponding one of said inner coaxial conductors, and exits through an aperture in said waveguide transmission line end of a corresponding one of said waveguide-to-coaxial line transition assemblies, whereby said optical fiber transmission lines and optical coupling devices are fully integrated into said inner conductor of each of said waveguide-to-coaxial transition assemblies.

6. The rotary joint of claim 1 further including a means for creating a pressure seal to prevent gas from entering into or escaping from said common rotary interface plane.

7. The rotary joint of claim 6 wherein said pressure seal excludes contaminants from said common rotary interface plane.

8. The rotary joint of claim 1 further including a means for preventing electrical leakage of the radio frequency electromagnetic waves from the outer coaxial conductor of each of said coaxial transmission lines at said common rotary interface plane, comprising an overlap coupling of each said outer coaxial conductor of approximately one-quarter wavelength of the primary operating frequency and a parallel reflective cavity of similar length, followed by an overlap coupling of approximately three-quarter wavelength of the primary operating frequency, whereby electrical leakage of the radio frequency electromagnetic waves is further reduced and higher order common mode resonances are minimized.

9. The rotary joint of claim 1 wherein said pair of optical coupling devices each comprise a lens.

10. The rotary joint of claim 1 wherein the pair of optical coupling devices each comprise a C-lens with an angled back end.

11. The rotary joint of claim 1 wherein said pair of optical coupling devices each comprise an optical taper.

12. The rotary joint of claim 1 wherein each said optical coupling device comprises a dielectric horn with gradient indexes of refraction.

13. The rotary joint of claim 1 wherein said pair of optical coupling devices each comprise at least one mirrored reflector.

14. The rotary joint of claim 1 wherein each said optical coupling device includes anti-reflective coatings.

15. The rotary joint of claim 1 wherein said dielectric sleeve bearing at said inner coaxial conductor excludes particulate material from said pair of optical coupling devices.

* * * * *